United States Patent
Beato et al.

(10) Patent No.: US 8,728,206 B2
(45) Date of Patent: *May 20, 2014

(54) METHOD OF REMOVING METAL CARBONYLS FROM GASEOUS STREAMS AND METAL CARBONYL SORBENT

(75) Inventors: Pablo Beato, Copenhagen S (DK); Poul Erik Højlund Nielsen, Fredensborg (DK)

(73) Assignee: Haldor Topsoe A/S, Lyngby (DK)

( * ) Notice: Subject to any disclaimer, the term of this patent is extended or adjusted under 35 U.S.C. 154(b) by 13 days.

This patent is subject to a terminal disclaimer.

(21) Appl. No.: 13/807,136

(22) PCT Filed: May 17, 2011

(86) PCT No.: PCT/EP2011/002446
§ 371 (c)(1),
(2), (4) Date: Dec. 27, 2012

(87) PCT Pub. No.: WO2012/003900
PCT Pub. Date: Jan. 12, 2012

(65) Prior Publication Data
US 2013/0098243 A1    Apr. 25, 2013

(30) Foreign Application Priority Data

Jul. 5, 2010 (DK) .................................. 2010 00591

(51) Int. Cl.
*B01D 53/02* (2006.01)
(52) U.S. Cl.
USPC ............................................ 95/133; 423/600
(58) Field of Classification Search
CPC .............. B01D 53/02; B01D 53/1456; B01D 53/1487; B01D 53/64; B01D 53/14; B01D 2255/20761; B01D 2255/2092; B01D 2255/405; B01D 2256/16; B01D 2256/20; B01D 2257/60; B01J 20/02; B01J 20/04; B01J 20/08; B01J 20/30; B01J 21/005; B01J 21/04; B01J 23/005; B01J 23/72; B01J 37/0045; B01J 37/03; B01J 37/031; B01J 37/08; B01J 37/16; B01J 37/18
USPC ............................................ 95/133; 423/600
See application file for complete search history.

(56) References Cited

U.S. PATENT DOCUMENTS

| | | | |
|---|---|---|---|
| 4,425,312 A | 1/1984 | Brignac | |
| 4,690,806 A | 9/1987 | Schorfheide | |
| 8,551,218 B2 * | 10/2013 | Nielsen et al. | 95/128 |
| 8,637,580 B2 * | 1/2014 | Nielsen et al. | 518/713 |
| 2009/0280053 A1 * | 11/2009 | Roesch | 423/594.5 |
| 2009/0281365 A1 * | 11/2009 | Hatscher et al. | 585/824 |
| 2011/0280782 A1 * | 11/2011 | Hatscher et al. | 423/247 |

FOREIGN PATENT DOCUMENTS

EP    0 790 074 A1    8/1997
EP    2 172 267 A1    4/2010

* cited by examiner

*Primary Examiner* — Christopher P Jones
(74) *Attorney, Agent, or Firm* — Dickstein Shapiro LLP

(57) ABSTRACT

Method of removing metal carbonyls from a gaseous stream comprising contacting the metal carbonyl containing gaseous stream at elevated temperature with a particulate sorbent comprising modified copper aluminum spinel, wherein the copper aluminium spinel has been modified by a thermal treatment in a reducing atmosphere and a particulate sorbent for use in a method comprising a copper aluminium spinel being modified by thermal treatment in a reducing atmosphere at a temperature of between 250 and 500° C.

6 Claims, 1 Drawing Sheet

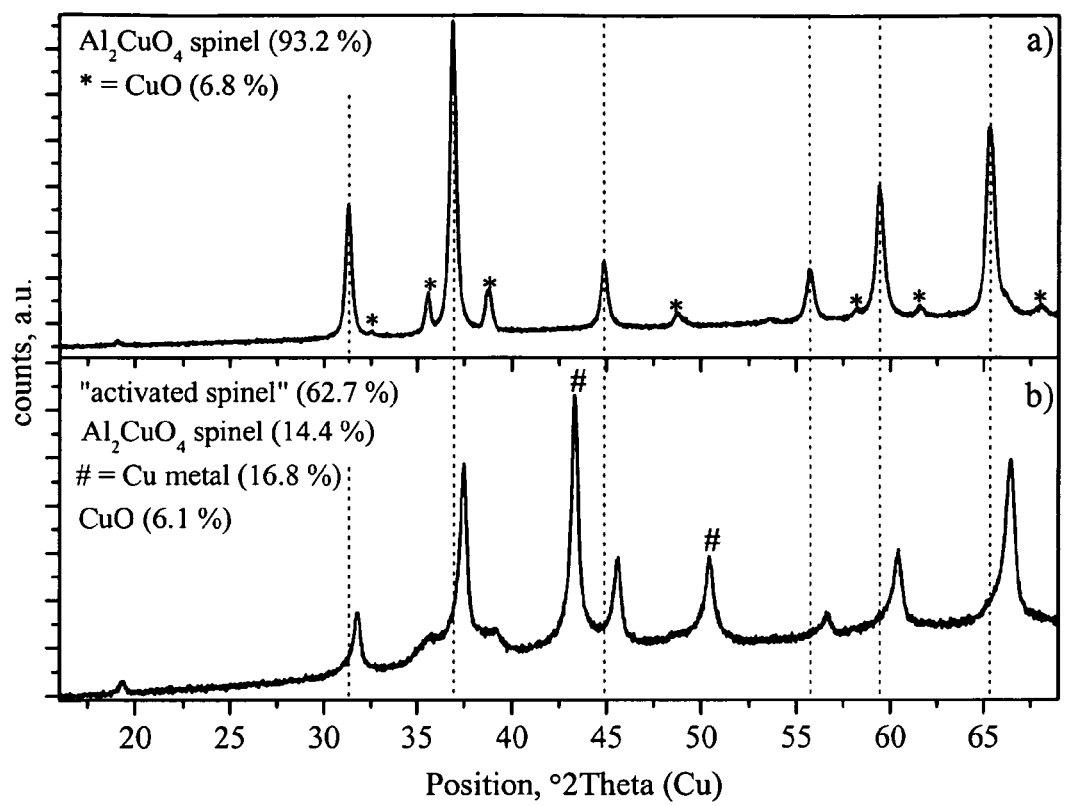

METHOD OF REMOVING METAL CARBONYLS FROM GASEOUS STREAMS AND METAL CARBONYL SORBENT

The present invention relates to a method for the removal of metal carbonyl compounds from a gaseous stream by contacting the stream with a solid sorbent. More particularly, the invention provides a method by which metal carbonyls being present as impurities in a gaseous stream are removed and passivated by contact with a modified copper aluminium spinel sorbent at elevated temperatures.

Chemical processes that use gas mixtures with a high CO partial pressure at elevated temperature focus the problem of metal carbonyl formation via reactions of CO with tubings and other steel or iron construction materials. Metal carbonyls, in particular $Ni(CO)_4$ and $Fe(CO)_5$ can act as severe poison for several catalyst systems that convert gas to more valuable products. In the case of $Fe(CO)_5$ the deactivation arises from the formation of a Fe-carbide phase, which consequently acts as a Fischer-Tropsch catalyst and provokes waxing of the catalyst and thereby hindering the access to the active sites. Due to the increasing trend of using coal and biomass as source for synthesis gas newly designed synthesis gas conversion processes need to be effectively protected against metal carbonyls.

We have found that when modifying copper aluminium spinel by treatment in a reducing atmosphere at elevated temperatures provides an effective sorbent material for the removal of carbonyl compounds from a gaseous stream.

Pursuant to this finding this invention provides a method of removing metal carbonyls from a gaseous stream comprising contacting the metal carbonyl containing gaseous stream with a particulate sorbent comprising modified copper aluminum spinel, wherein the copper aluminium spinel has been modified by a thermal treatment in a reducing atmosphere.

Copper aluminum spinels are per se known compounds and the preparation of copper aluminum spinel is described in the art e.g. Z.Phys.Chem., 141 (1984), 101-103. An essential step of the method according to the invention is the modification of copper aluminum spinel.

Preferably, the particulate sorbent further comprises copper oxide in excess to the amount being present in the copper aluminum spinel prior to modification.

A typical preparation method comprises co-precipitation of copper and aluminum salts and calcination in air at a temperature of between 700° C. and 900° C. to form crystals with the spinel structure.

An essential step of the method according to the invention is the modification of copper aluminum spinel. To this end the spinel prepared as for instance mentioned above is subjected to thermal treatment in a reducing atmosphere.

The length of the treatment depends on the temperature and composition of the reducing atmosphere.

Reducing atmospheres being useful in the modification of the copper aluminum spinel are hydrogen or gas mixtures containing hydrogen and carbon monoxide, such as synthesis gas diluted with an inert gas.

A preferred reducing atmosphere consists of 5 vol. % carbon monoxide, 5 vol. % carbon dioxide and 90 vol. % hydrogen. A further preferred reducing atmosphere contains about 0.5 vol. % carbon monoxide, about 5 vol. % carbon dioxide and about 5 vol. % hydrogen in nitrogen.

Typically, the temperature employed in the thermal treatment step will be between 250 and 500° C.

The thus modified sorbent is effective at temperatures at 150 to 300° C. Therefore it will be possible in a number of chemical reactions for the conversion of a gaseous reactant stream to place the absorbent directly on top of a catalyst bed instead of having a separate guard reactor, which would also imply a cooling and/or heating step of the gaseous stream prior to contact with the catalyst.

As already introductorily mentioned, the method according to the invention is particular useful in the treatment of carbon monoxide containing gaseous streams, such as synthesis gas. By means of the modified copper aluminum sorbent, the content of metal carbonyls in such gases can be removed to the low ppb level, typically below 1 ppb.

The invention provides additionally a particular sorbent being useful in the above disclosed method.

The sorbent according to the invention comprises a copper aluminium spinel being modified by calcination in a reducing atmosphere at a temperature of between 250 to 500° C.

FIG. 1 shows the XRD analysis of the $Al_2CuO_4$ sorbent calcined at 835° C. (FIG. 1a) and the resulting activated sorbent after treatment in 3% $H_2$ in Ar at 350° C. (FIG. 1b). The XRD pattern of the calcined $Al_2CuO_4$ sorbent can be fitted by the Rietvield refinement method to a composition of 93.2 wt % $Al_2CuO_4$ (PDF 04-011-8984) and 6.8 wt % CuO (PDF 04-012-7238). After the activation in reducing atmosphere the XRD pattern changes visibly (FIG. 1b). A Rietvield refinement results in 14.4 wt % of remaining $Al_2CuO_4$ (PDF 04-011-8984) spinel phase and 62.7 wt % of a new spinel type phase which was best fitted with $\gamma$-$Al_{2.67}O_4$ (PDF 04-007-2479). The activated sorbent further contains 16.8 wt % Cu metal and 6.1 wt % CuO (PDF 04-012-7238). The lattice parameters and crystal sizes of all refined structures are given in Table 1-2.

TABLE 1

Relevant parameters for calcined sorbent

| Compound | PDF number | Relative amount [wt %] | Space group (No.) | Refined Lattice constants [Å] |
|---|---|---|---|---|
| $Al_2CuO_4$ | 04-011-8984 | 93.2 | Fd-3m (227) | 8.0766 |
| CuO | 04-012-7238 | 6.8 | C12/c1 (15) | a = 4.6930; b = 3.4201; c = 5.1294 |

TABLE 2

Relevant parameters for activated sorbent

| Compound | PDF number | Relative amount [wt %] | Space group (No.) | Refined Lattice constants [Å] |
|---|---|---|---|---|
| $Al_2CuO_4$ | 04-011-8984 | 14.4 | Fd-3m (227) | 8.0250 |
| CuO | 04-012-7238 | 6.1 | C12/c1 (15) | a = 4.6836; b = 3.4231; c = 5.1265 |
| "$\gamma$-$Al_{2.67}O_4$" | 04-007-2479 | 62.7 | Fd-3m (227) | 7.9600 |
| Cu | 04-001-0092 | 16.8 | Fm-3m (225) | 3.6176 |

EXAMPLES

Example 1

Preparation of a Copper Aluminum Spinel for Use in the Invention

In a precipitation tank 78.4 kg of copper nitrate solution with 8.1% Cu (100 mol Cu) is added to 360 l water. The thus prepared solution is precipitated at room temperature with 47.3 kg potassium-aluminate (11.4% Al or 200 mol Al). The pH value of the forming slurry is currently adjusted to 8.5 by conc. nitric acid. 45 kg $KHCO_3$ solution (11.1% $KHCO_3$) are added to the slurry and the slurry is allowed to mature after heating to 80° C. After washing, the slurry is spray dried and calcined at 800° C. to form $CuAl_2O_4$.

Example 2

Modification of the Copper Aluminum Spinel

The copper aluminum spinel prepared in Example 1 is modified in a reducing atmosphere consisting of 0.5 vol. % CO, 5 vol. % CO2 and 5 vol. % H2 in nitrogen at a space velocity of 4000 Nl/h*kg at 380° C. for about 3 hours.

The thus modified copper aluminum spinel has an X-ray powder diffraction pattern as shown in FIG. 1 in the drawings and summarized in Table 1 below.

Example 3

Sorption Test of the Modified Copper Aluminum Spinel Sorbent Prepared in Example 2 in the Removal of Iron Carbonyl The test is performed in Cu-lined steel reactor tubes of 50 cm length and an inner diameter of 7 mm. The standard reaction conditions are conducted with a synthesis gas containing 5% $CO_2$, 3% Ar, 26% CO, ($H_2$ balanced) at 210° C., 75 barg and a flow of 50 Nl/h.

An iron wire of 10 cm length is placed in the top part of the reactor to produce iron carbonyls when contacted with the synthesis gas. For the experiments the iron wire was acid-etched to give a relatively stable amount of iron carbonyls in the range of 15 to 20 ppb. Before loading, the wire is rolled up to a spherical shape (diameter about the size of the reactors' inner diameter). The wire is then degreased by dipping it for 30 seconds into 25 ml of acetone and in continuation etched for 10 minutes in 25 ml of 10% $HNO_3$. After etching, the wire is rinsed with de-ionized water and pat dried on a piece of paper. Below the iron wire, a stacked bed (separated by glass wool) of five layers of the sorbent were placed. Each layer contained 400 mg with a particle size of 300 to 600 μm. The stacked sorbent bed pellets A1 to A5 are followed by a string of 10 pellets of a Cu containing methanol catalyst (in total approx. 2 g). Each experiment is typically run for 6 to 7 days. During a run the methanol activity of the catalyst is measured by means of GC gas phase analysis. After cooling in $N_2$ and passivation, the sorbent and the catalyst are taken out of the reactor pellet- and layer-wise, in the same order as introduced. Each sorbent zone and a sample of a fresh sorbent are analysed by ICP-MS to determine the Fe-content and total C-content. The methanol catalyst pellets C1-3 and C8-10 (1=top) are separately sent to Fe analysis, while pellets C4-7 were mixed and extracted with a mixture of isooctane and carbon disulphide to analyse the exact carbon composition via GC-MS. The methanol condensate was analysed for Fe to check for any Fe slip. From the analysis results of all samples, the total Fe concentration in the feed was determined and an absorption profile along the reactor established (see Table 3).

TABLE 3

Fe carbonyl guard test at 5% $CO_2$, 3% Ar, 26% CO, 66% $H_2$ at 210° C., 75 barg and a flow of 50 Nl/h, time on stream 792 h. Conc. of $Fe(CO)_5$ in the feed = 16 ppb

| Absorber layer/catalyst pellet (from top) | A1 | A2 | A3 | A4 | A5 | C1 | C2 | C3 | C4-C7 | C8 | C9 | C10 |
|---|---|---|---|---|---|---|---|---|---|---|---|---|
| Fe content (wt ppm) | 2930 a | 815 a | 95 a | 65 a | 75 a | 30 b | 20 b | 20 b | 20 b | 20 b | — | 20 b |
| C content (wt %) | 0.42 | 0.37 | 0.35 | 0.34 | 0.34 | | | | 6.27 | | | |
| Removal efficiency (%) | | | 97.9 | | | | | | 2.1 | | | | a initial Fe content was 65 wt ppm;

b initial Fe content was 20 wt ppm.

The invention claimed is:

1. Method of removing metal carbonyls from a gaseous stream comprising:
   contacting the metal carbonyl containing gaseous stream at elevated temperature with a particulate sorbent comprising modified copper aluminum spinel, wherein the copper aluminium spinel has been modified by a thermal treatment in a reducing atmosphere.

2. Method of claim 1, wherein the thermal treatment includes heating of the copper aluminum spinel at a temperature of between 250 to 500° C.

3. Method of claim 1, where the reducing atmosphere is synthesis gas, optionally diluted with an inert gas.

4. Method of claim 1, wherein the gaseous stream contains carbon monoxide.

5. Method of claim 1, wherein the particulate sorbent further comprises copper oxide in addition to the copper aluminum spinel prior to the modification.

6. Method of 1 claim 1, wherein the particulate sorbent further comprises copper in excess to the amount being present in the copper aluminum spinel.